US012771241B2

(12) United States Patent
Yang et al.

(10) Patent No.: US 12,771,241 B2
(45) Date of Patent: Oct. 20, 2026

(54) MULTI-PHASE POWER CONVERTER AND METHOD OF CONTROLLING THE SAME

(71) Applicant: DELTA ELECTRONICS, INC., Taoyuan City (TW)

(72) Inventors: Shang-Kay Yang, Taoyuan City (TW); Hsien-Kai Wang, Taoyuan City (TW); Yen-Wei Lin, Taoyuan City (TW)

(73) Assignee: DELTA ELECTRONICS, INC., Taoyuan City (TW)

( * ) Notice: Subject to any disclaimer, the term of this patent is extended or adjusted under 35 U.S.C. 154(b) by 228 days.

(21) Appl. No.: 18/425,763

(22) Filed: Jan. 29, 2024

(65) Prior Publication Data

US 2025/0080006 A1 Mar. 6, 2025

(30) Foreign Application Priority Data

Sep. 4, 2023 (CN) ......................... 202311129940.6

(51) Int. Cl.
*H02M 1/42* (2007.01)
*H02M 1/00* (2007.01)
*H02M 7/219* (2006.01)

(52) U.S. Cl.
CPC ....... *H02M 1/4233* (2013.01); *H02M 1/0032* (2021.05); *H02M 7/219* (2013.01)

(58) Field of Classification Search
CPC ............. H02M 1/4208; H02M 1/4216; H02M 1/4225; H02M 1/4233; H02M 1/0032; H02M 1/0035
See application file for complete search history.

(56) References Cited

U.S. PATENT DOCUMENTS

| | | | | |
|---|---|---|---|---|
| 10,097,092 B1 | 10/2018 | Ho et al. | | |
| 10,511,235 B1* | 12/2019 | Lin | ..................... | H02M 7/5395 |
| 10,770,966 B2 | 9/2020 | Marcinkiewicz | | |
| 2009/0256535 A1* | 10/2009 | Houston | ............. | H02M 3/1584 323/262 |

(Continued)

FOREIGN PATENT DOCUMENTS

| | | | |
|---|---|---|---|
| TW | 200608688 A | 3/2006 |
| TW | I638508 B | 10/2018 |

OTHER PUBLICATIONS

Office Action dated May 3, 2024 of the corresponding Taiwan patent application No. 112133432.

*Primary Examiner* — Gustavo A Rosario-Benitez
(74) *Attorney, Agent, or Firm* — Muncy, Geissler, Olds & Lowe, P.C.

(57) ABSTRACT

A multi-phase power converter includes at least two power conversion circuits and a control signal generation unit. Each power conversion circuit includes a switch bridge arm formed by an upper switch and a lower switch connected in series. The control signal generation unit receives an output current of the multi-phase power converter and acquires a loading condition of the multi-phase power converter according to the output current, and provides control signals for each upper switch and each lower switch. The control signal generation unit correspondingly turns on or turns off the upper switches and the lower switches according to the loading condition being a light-loading condition so that the at least two switch bridge arms are alternately driven.

15 Claims, 9 Drawing Sheets

(56) References Cited

U.S. PATENT DOCUMENTS

| | | | | |
|---|---|---|---|---|
| 2015/0303802 | A1* | 10/2015 | Childs | H02M 3/158<br>323/271 |
| 2021/0050773 | A1* | 2/2021 | Lin | H02M 1/10 |
| 2021/0226528 | A1* | 7/2021 | Gu | H02M 1/0032 |
| 2022/0209659 | A1* | 6/2022 | Cai | H03K 17/063 |
| 2023/0246542 | A1* | 8/2023 | Malinin | H02M 1/4225<br>363/78 |
| 2025/0253757 | A1* | 8/2025 | Yang | H02M 1/0054 |

* cited by examiner

MULTI-PHASE POWER CONVERTER AND METHOD OF CONTROLLING THE SAME

BACKGROUND

Technical Field

The present disclosure relates to a multi-phase power converter and a method of controlling the same, and more particularly to multi-phase power converter with at least two switch bridge arms alternately driven and a method of controlling the same.

Description of Related Art

The statements in this section merely provide background information related to the present disclosure and do not necessarily constitute prior art.

In recent years, with the rapid development of the information industry, power supplies have become an indispensable key role. As the power demand of large information equipment gradually increases, the output power of the power supply also gradually increases due to the increase in load demand.

When the power of a single power supply is sufficient, the front-end AC-to-DC converter usually adopts a single power factor correction (PFC) structure. However, when the overall power of the system increases, the disadvantages will become apparent so that more parallel-connected power supplies are needed to meet the demand. When an N-phase power conversion structure is used, in order to acquire higher efficiency, only one phase will operate when the load is light (i.e., in a light-loading condition), and it will fully start when the load gradually increases to a certain level.

The AC-to-DC (alternating current/direct current) converter uses a circuit structure with upper and lower arm switches. If the drive circuits of driving the upper and lower fast-switching arms use independent power supplies, under a lighter loading condition, other phases will be turned off, and the upper-arm drive power source will remain greater than the UVLO (undervoltage-lockout) state of the drive IC. This design is suitable for use when the power supply supplies a heavy load momentarily from no load or light load. As shown in FIG. 1, two power conversion structures are as an example, that is, the multi-phase power converter includes a first power conversion circuit 91 and a second power conversion circuit 92. When the drive circuits of driving the upper and lower fast-switching arms use independent power supplies, a total input current $I_{IN}$, a first input current $I_{IN1}$ flowing into the first power conversion circuit 91, and a second input current $I_{IN2}$ flowing into the second power conversion circuit 92 are as shown in the FIG. 2, which shows a schematic current waveform diagram of operating upper and lower drive circuits of the related-art power supply by independent power supplies. For the first power conversion circuit 91 and the second power conversion circuit 92 independently controlled, in the current waveform diagram shown in FIG. 2, under the light-loading condition (i.e., before time t1), the first power conversion circuit 91 operates (drives), while the second power conversion circuit 92 is idle. When the power supply momentarily provides a heavy load from no load or light load (i.e., after time t1), since the DC driving voltage Vcc for the drive IC is greater than the UVLO voltage, the second power conversion circuit 92 does not require the time of charging the upper arm, and the upper and lower arm switches can immediately work normally. In this condition, there will be no instantaneous large current stress. However, using independent power supplies will increase the size and cost of the circuits.

When the drive circuits of driving the upper and lower fast-switching arms use a single power supply, a diode is usually added to the DC driving voltage Vcc (i.e., the upper arm power supply). When the lower arm is turned on, the upper arm capacitor is charged though the diode in the forward direction. If the voltage of the upper arm capacitor is lower than the UVLO voltage of the drive IC, the upper arm drive signal will be forcibly turned off. Under the light-loading condition, only one phase power conversion is used to increase efficiency, and other phases are forced to stand by. However, when the loading suddenly increases, all phases must be turned on, including the phases that were originally forced to stand by. However, since the voltages of the upper arm capacitors may be lower than the UVLO voltage of the drive IC, their upper arm drive signals will be forcibly turned off, which may not be able to provide enough energy, resulting in a lower output voltage. As shown in FIG. 3, which shows a schematic current waveform diagram of operating upper and lower drive circuits of the related-art power supply by a single power supply. Although the voltage of the upper arm drive signal Vcc can be maintained by turning on the lower arm switch during standby to prevent it from falling below the UVLO voltage, it also has a side effect affecting the total harmonic distortion of the current. Since the lower arm must be forced to be turned on, the total input current $I_{IN}$ must provide the second input current $I_{IN2}$. However, since the role of the second input current $I_{IN2}$ is only to maintain the voltage Vcc of the upper arm drive signal, the burst mode is generally adopted. In a short period of conduction, the upper arm drive power supply has the sufficient driving voltage Vcc. However, the current quality of the total input current $I_{IN}$ will be degraded.

Therefore, how to design a multi-phase power converter and a method of controlling the same to solve the problems and technical bottlenecks in the existing technology has become a critical topic in this field.

SUMMARY

An objective of the present disclosure is to provide a multi-phase power converter. The multi-phase power converter converts an input power source into an output power source. The multi-phase power converter includes at least two power conversion circuits and a control signal generation unit. Each power conversion circuit includes a switch bridge arm formed by an upper switch and a lower switch connected in series. The control signal generation unit receives an output current of the multi-phase power converter and acquires a loading condition of the multi-phase power converter according to the output current, and provides control signals for each upper switch and each lower switch. The control signal generation unit correspondingly turns on or turns off the upper switches and the lower switches according to the loading condition being a light-loading condition so that the at least two switch bridge arms are alternately driven.

Another objective of the present disclosure is to provide a method of controlling a multi-phase power converter. The multi-phase power converter includes at least two power conversion circuits, and each power conversion circuit includes a switch bridge arm formed by an upper switch and a lower switch connected in series. The method includes steps of: determining a loading condition of the multi-phase power converter according to an output current of the multi-phase power converter, and controlling the at least two switch bridge arms to be alternately driven when the loading condition is a light-loading condition.

Accordingly, the present disclosure has the following features and advantages. 1. The driving circuit of the multi-phase power converter of the present disclosure uses a single power supply so that it is beneficial to the miniaturized circuit design and cost reduction. 2. The total harmonic distortion of the total input current is significantly reduced, which increases the current quality. 3. The multi switch bridge arms are driven alternately, and each with an average conduction/turned-on time so that the power loss is also average. Moreover, the temperatures of the switch transistors are more even. In addition to the design that helps with heat dissipation and cooling, it is also less likely to cause a large difference in life due to imbalance in usage time.

It is to be understood that both the foregoing general description and the following detailed description are exemplary, and are intended to provide further explanation of the present disclosure as claimed. Other advantages and features of the present disclosure will be apparent from the following description, drawings and claims.

BRIEF DESCRIPTION OF DRAWINGS

The present disclosure can be more fully understood by reading the following detailed description of the embodiment, with reference made to the accompanying drawing as follows.

DETAILED DESCRIPTION

Figure 1:
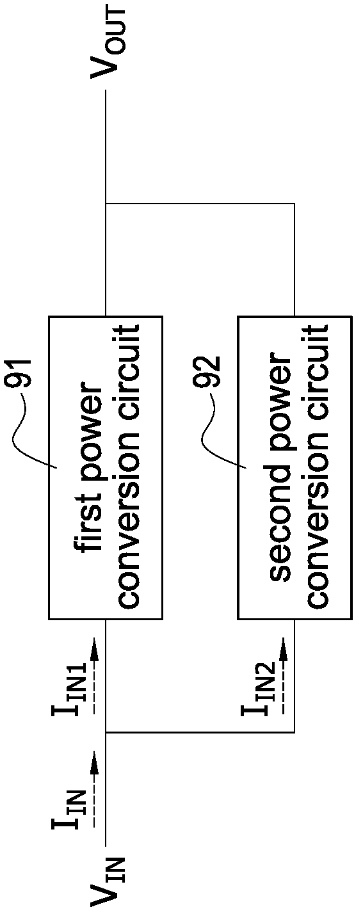
FIG.1 (related art)
FIG. 1 is a block circuit diagram of a related-art multi-phase power converter.
Figure 2:
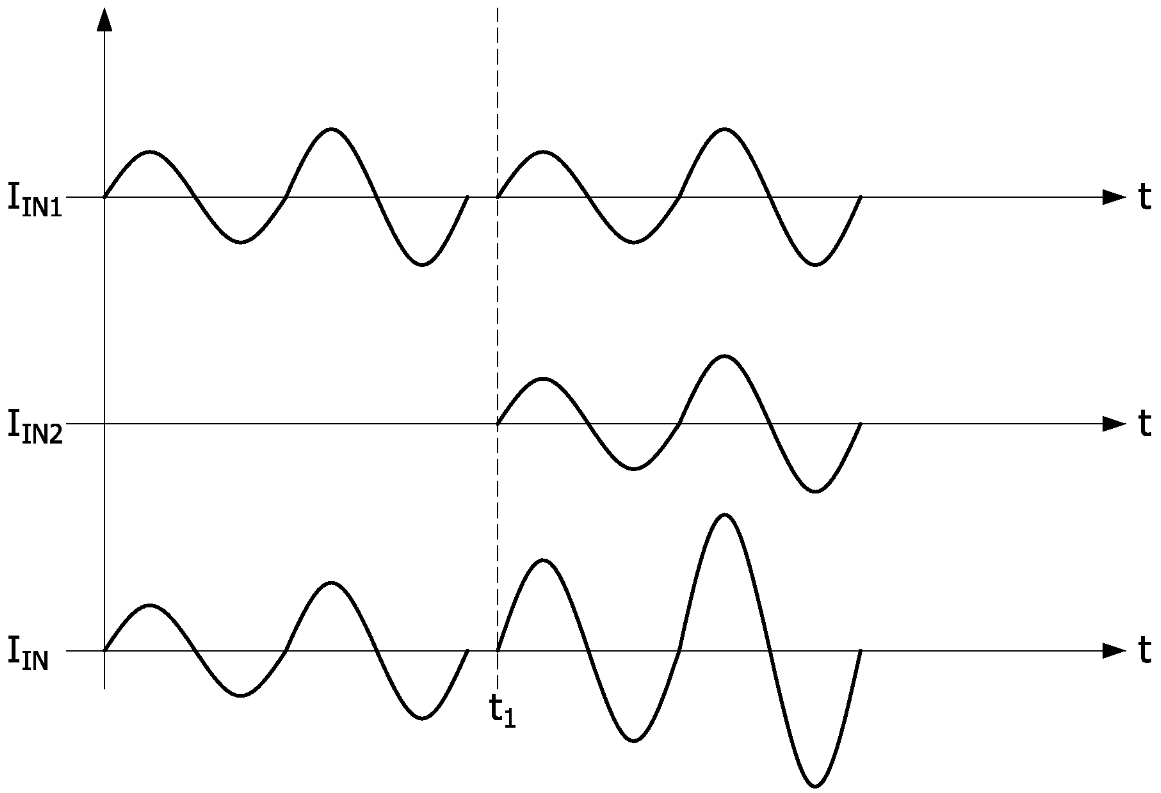
FIG.2 (related art)
FIG. 2 is a schematic current waveform diagram of operating upper and lower drive circuits of the related-art power supply by independent power supplies.
Figure 3:
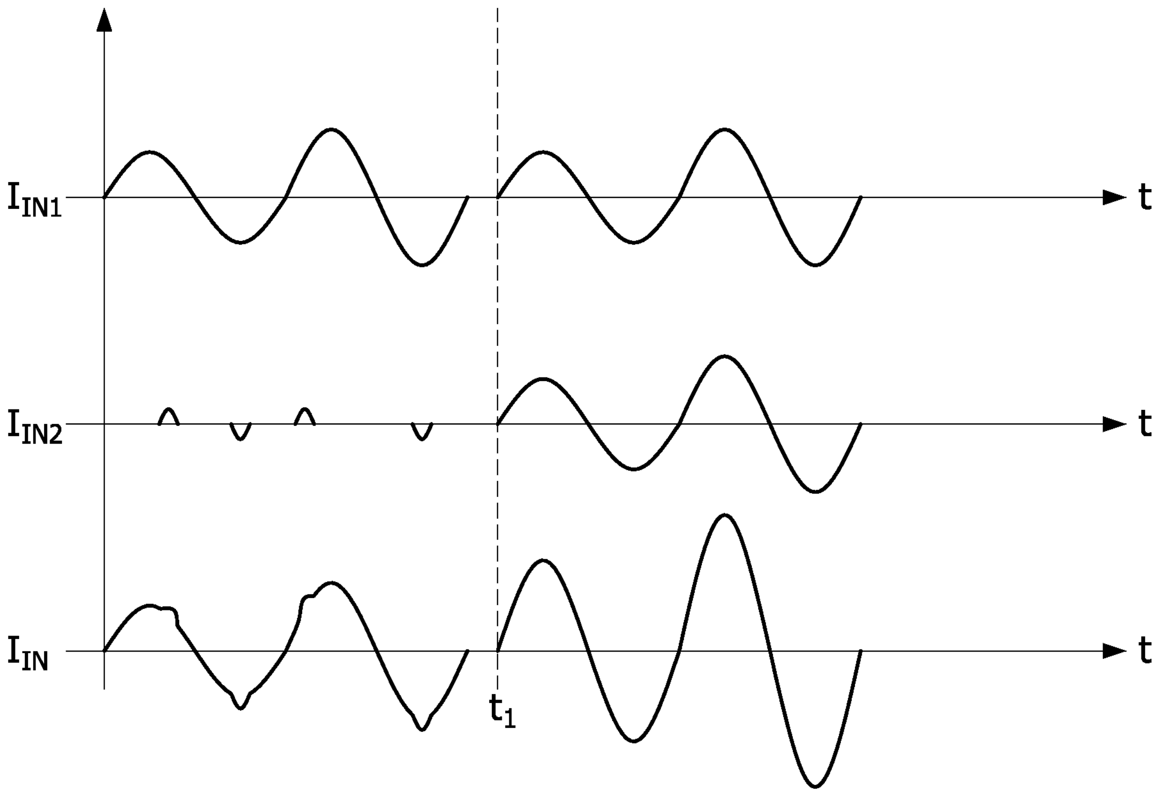
FIG.3 (related art)
FIG. 3 is a schematic current waveform diagram of operating upper and lower drive circuits of the related-art power supply by a single power supply.

Reference will now be made to the drawing figures to describe the present disclosure in detail. It will be understood that the drawing figures and exemplified embodiments of present disclosure are not limited to the details thereof.

Figure 4:
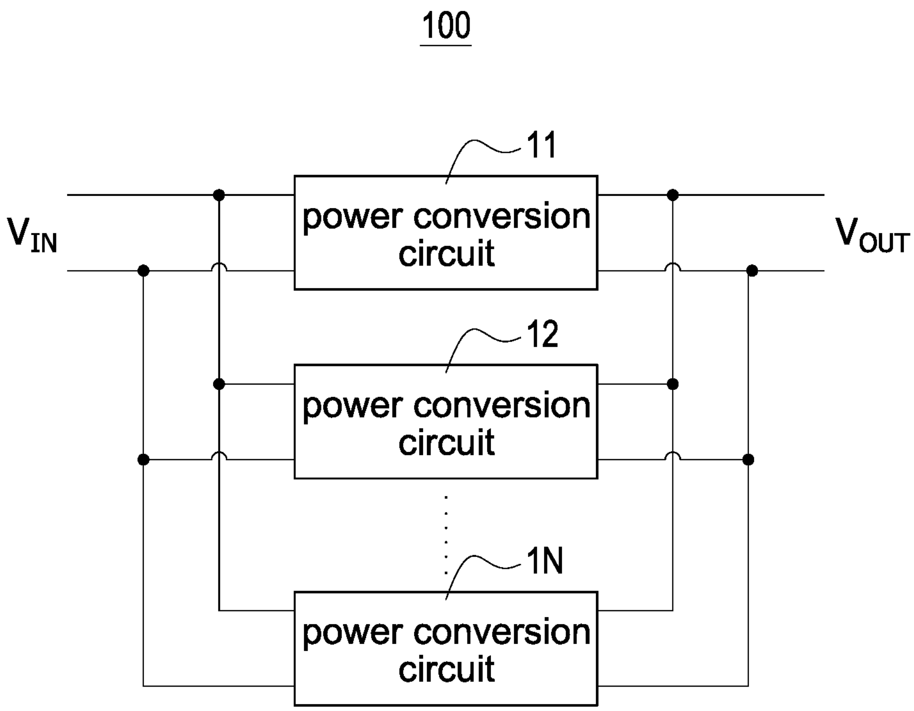
FIG. 4 is a block structure diagram of a multi-phase power converter according to the present disclosure.

Please refer to FIG. 4, which shows a block structure diagram of a multi-phase power converter according to the present disclosure. The multi-phase (N-phase) power converter 100 converts an input power source $V_{IN}$ into an output power source $V_{OUT}$. In particular, the input power source $V_{IN}$ may be an alternating current (AC) power source or a direct current (DC) power source, and the output power source $V_{OUT}$ may be an AC power source or a DC power source. That is, the multi-phase power converter 100 can be used for AC-to-DC conversion, DC-to-AC conversion, and DC-to-DC conversion.

The multi-phase power converter 100 includes at least two power conversion circuits 11-IN, and the power conversion circuits 11-1N are connected in parallel to each other for an application of high output power so as to meet the increased power demand of large-scale information equipment. Please refer to FIG. 5 (which shows a circuit diagram of the multi-phase power converter having two switch bridge arms according to the present disclosure) or FIG. 6 (which shows a circuit diagram of the multi-phase power converter having three switch bridge arms according to the present disclosure), each power conversion circuit 11-1N, namely the power conversion circuit 21, 22, 23 includes switch bridge arms formed by upper switches $Q_{H1}$, $Q_{H2}$, $Q_{H3}$ and lower switches $Q_{L1}$, $Q_{L2}$, $Q_{L3}$ connected in series.

Figure 5:
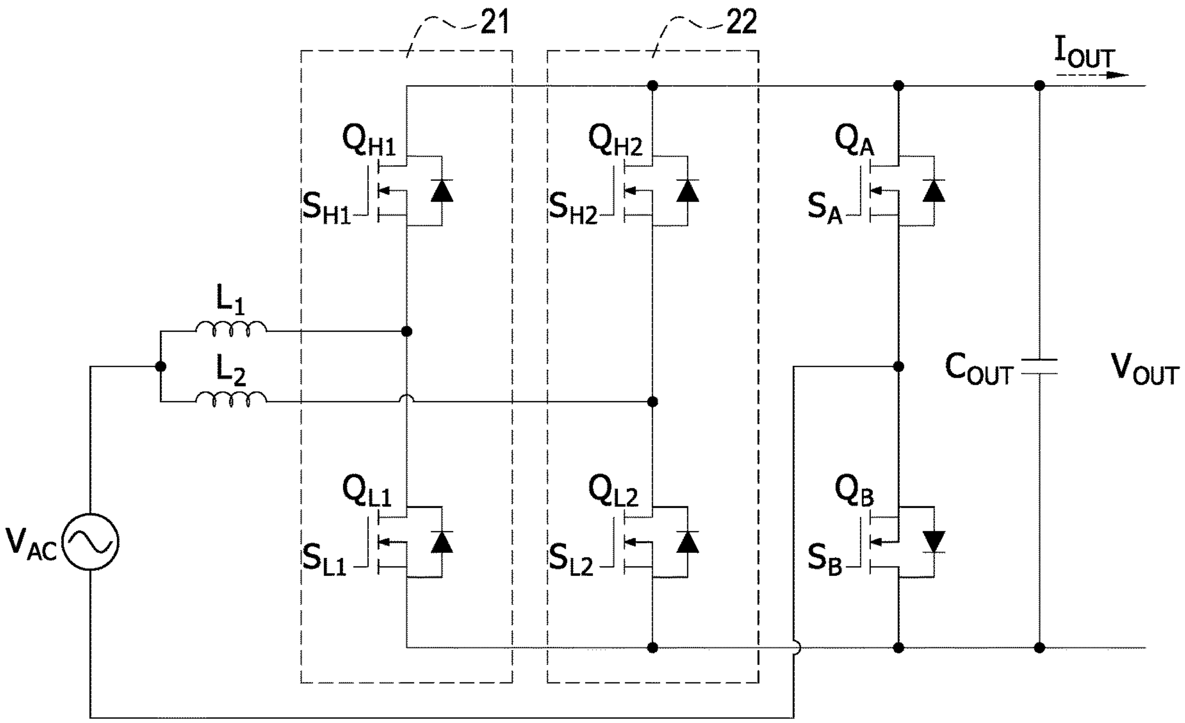
FIG. 5 is a circuit diagram of the multi-phase power converter having two switch bridge arms according to the present disclosure.

As shown in FIG. 5, the multi-phase power converter 100 is used for AC-to-DC conversion, that is, as a power factor corrector (PFC). The multi-phase power converter 100 includes two power conversion circuits 21, 22, that is, two switch bridge arms 21, 22 involving a first switch bridge arm 21 and a second switch bridge arm 22. The first switch bridge arm 21 includes a first upper switch Qui and a first lower switch $Q_{L1}$ connected in series. The second switch bridge arm 22 includes a second upper switch $Q_{H2}$ and a second lower switch $Q_{L2}$ connected in series.

Figure 6:
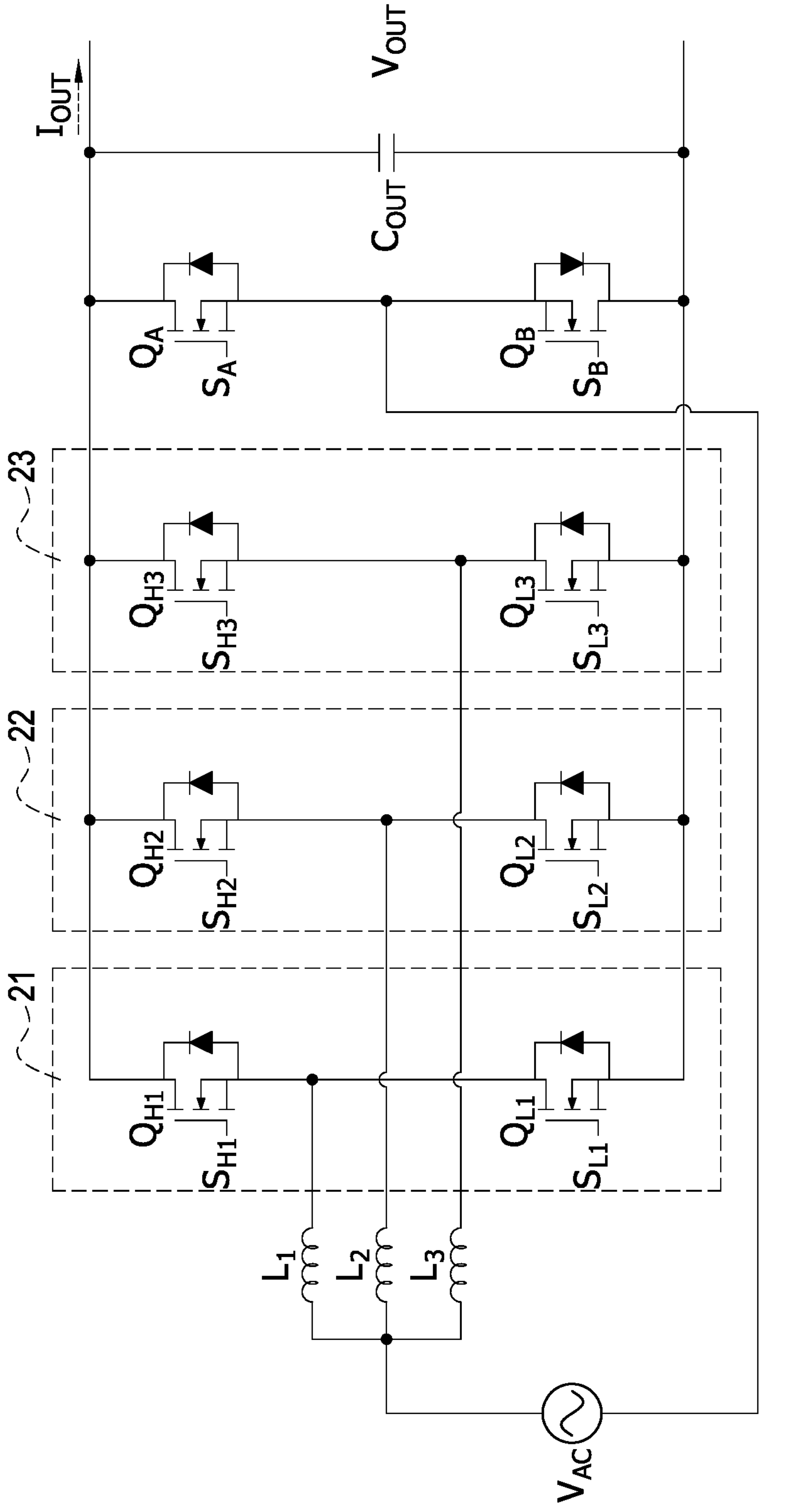
FIG. 6 is a circuit diagram of the multi-phase power converter having three switch bridge arms according to the present disclosure.

As shown in FIG. 6, the multi-phase power converter 100 is also used for AC-to-DC conversion, that is, as the power factor corrector (PFC). In comparison with the embodiment shown in FIG. 5, the multi-phase power converter 100 includes three power conversion circuits 21, 22, 23, that is, three switch bridge arms 21, 22, 23 involving a first switch bridge arm 21, a second switch bridge arm 22, and a third switch bridge arm 23. The first switch bridge arm 21 includes a first upper switch Qui and a first lower switch $Q_{L1}$ connected in series. The second switch bridge arm 22 includes a second upper switch $Q_{H2}$ and a second lower switch $Q_{L2}$ connected in series. The third switch bridge arm 23 includes a third upper switch $Q_{H3}$ and a third lower switch $Q_{L3}$ connected in series.

In the application of the power factor corrector in FIG. 6, the first switch bridge arm 21, the second switch bridge arm 22, and the third switch bridge arm 23 are used as fast-switching bridge arms. In addition, the circuit structure further includes a slow-switching bridge arm, which includes a slow-switching upper switch QA and a slow-switching lower switch QB connected in series. The same is true for FIG. 5, so no further description is given.

Moreover, the multi-phase power converter 100 includes a control signal generation unit. In particular, the control signal generation unit is not limited to a specific form, for example, any controller, control circuit, etc. that can be used to generate signals for controlling the upper and lower switches of the switch arms should be included in the scope of the present disclosure. The control signal generation unit receives an output current $I_{OUT}$ of the multi-phase power converter 100 to acquire a loading condition, such as a light-loading condition or a heavy-loading condition of the multi-phase power converter 100, and provides control signals for controlling the upper switches $Q_{H1}$, $Q_{H2}$, $Q_{H3}$ and the lower switches $Q_{L1}$, $Q_{L2}$, $Q_{L3}$.

As shown in FIG. 5 and FIG. 6, the control signal generation unit provides a first upper switch control signal $S_{H1}$ to control the first upper switch Qui of the first switch bridge arm 21, and provides a first lower switch control signal $S_{L1}$ to control the first lower switch $Q_{L1}$ of the first switch bridge arm 21. The control signal generation unit provides a second upper switch control signal $S_{H2}$ to control the second upper switch $Q_{H2}$ of the second switch bridge arm 22, and provides a second lower switch control signal $S_{L2}$ to control the second lower switch $Q_{L2}$ of the second switch bridge arm 22. As shown in FIG. 6, the control signal generation unit further provides a third upper switch control signal $S_{H3}$ to control the third upper switch $Q_{H3}$ of the third switch bridge arm 23, and provides a third lower switch control signal $S_{L3}$ to control the third lower switch $Q_{L3}$ of the third switch bridge arm 23.

Therefore, the control signal generation unit correspondingly turns on or turns off the upper switches $Q_{H1}$, $Q_{H2}$, $Q_{H3}$ and the lower switches $Q_{L1}$, $Q_{L2}$, $Q_{L3}$ according to the loading condition (based on the output current $I_{OUT}$) being a light-loading condition so that the at least two switch bridge arms are alternately driven. Taking the input power source $V_{IN}$ as an AC power source (such as the AC power source $V_{AC}$ in FIG. 5 and FIG. 6), the at least two switch bridge arms are alternately driven according to a time period of the AC power source $V_{AC}$. Incidentally, the control signal generation unit correspondingly turns on or turns off the upper switches $Q_{H1}$, $Q_{H2}$, $Q_{H3}$ and the lower switches $Q_{L1}$, $Q_{L2}$, $Q_{L3}$ according to the loading condition being a heavy-loading condition so that the at least two switch bridge arms are simultaneously driven.

The multi-phase power converter shown in FIG. 5 includes two switch bridge arms, that is the first switch bridge arm 21 and the second switch bridge arm 22 are alternately driven when a positive half cycle and a negative half cycle of the AC power source $V_{AC}$, namely the input power source $V_{IN}$ are exchanged. In other words, when the AC power source $V_{AC}$ is in the positive half cycle, the first upper switch control signal Smi and the first lower switch control signal $S_{L1}$ provided by the control signal generation unit respectively control the first upper switch $Q_{H1}$ and the first lower switch $Q_{L1}$ of the first switch bridge arm 21 to be alternately turned on and turned off. In this condition, only one phase, i.e., only the first switch bridge arm 21 operates, that is, the second switch bridge arm 22 is idle.

When the AC power source $V_{AC}$ is in the negative half cycle, the second upper switch control signal $S_{H2}$ and the second lower switch control signal $S_{L2}$ provided by the control signal generation unit respectively control the second upper switch $Q_{H2}$ and the second lower switch $Q_{L2}$ of the second switch bridge arm 22 to be alternately turned on and turned off. In this condition, only one phase, i.e., only the second switch bridge arm 22 operates, that is, the first switch bridge arm 21 is idle.

However, the above-mentioned operation of the first switch bridge arm 21 and the second switch bridge arm 22 respectively in the positive half cycle and negative half cycle is not intended to limit the present disclosure. That is, when the AC power source $V_{AC}$ is in the positive half cycle, the second switch bridge arm 22 is driven to operate (but the first switch bridge arm 21 is idle); when the AC power source $V_{AC}$ is in the negative half cycle, the first switch bridge arm 21 is driven to operate (but the second switch bridge arm 22 is idle). Although the first switch bridge arm 21 and the second switch bridge arm 22 operate in different half cycles, the same technical effect can still be achieved.

Therefore, for the two switch bridge arms as shown in FIG. 5, since the two switch bridge arms are alternately driven (each is 50% of the turned-on time period), the power loss is also 50%, and the temperature of the transistor switch is also more uniform. In addition to the design that is helpful for heat dissipation and cooling, it is not prone to the problem of great difference in life due to unbalanced use time.

The multi-phase power converter shown in FIG. 6 includes three switch bridge arms, that is the first switch bridge arm 21, the second switch bridge arm 22, and the third switch bridge arm 23 are alternately driven at intervals of 120 degrees (360/3 degrees) of the AC power source $V_{AC}$, namely the input power source $V_{IN}$. For example, but not to limit the present disclosure, when the AC power source $V_{AC}$ is in 0-degree electrical angle, the first upper switch control signal $S_{H1}$ and the first lower switch control signal $S_{L1}$ begin to be provided by the control signal generation unit respectively control the first upper switch $Q_{H1}$ and the first lower switch $Q_{L1}$ of the first switch bridge arm 21 to be alternately turned on and turned off. In this condition, only one phase, i.e., only the first switch bridge arm 21 operates, that is, the second switch bridge arm 22 and the third switch bridge arm 23 are idle.

When the AC power source $V_{AC}$ is in 120-degree electrical angle, the second upper switch control signal $S_{H2}$ and the second lower switch control signal $S_{L2}$ begin to be provided by the control signal generation unit respectively control the second upper switch $Q_{H2}$ and the second lower switch $Q_{L2}$ of the second switch bridge arm 22 to be alternately turned on and turned off. In this condition, only one phase, i.e., only the second switch bridge arm 22 operates, that is, the first switch bridge arm 21 and the third switch bridge arm 23 are idle.

When the AC power source $V_{AC}$ is in 240-degree electrical angle, the third upper switch control signal $S_{H3}$ and the third lower switch control signal $S_{L3}$ begin to be provided by the control signal generation unit respectively control the third upper switch $Q_{H3}$ and the third lower switch $Q_{L3}$ of the third switch bridge arm 23 to be alternately turned on and turned off. In this condition, only one phase, i.e., only the third switch bridge arm 23 operates, that is, the first switch bridge arm 21 and the second switch bridge arm 22 are idle.

However, the above-mentioned operation of the first switch bridge arm 21, the second switch bridge arm 22, and the third switch bridge arm 23 alternately driven at intervals of 120 degrees of the AC power source $V_{AC}$ is not intended to limit the present disclosure. That is, after the first switch bridge arm 21 operates (but the second switch bridge arm 22 and the third switch bridge arm 23 are idle), the third switch bridge arm 23 continues to operate (but the first switch bridge arm 21 and the second switch bridge arm 22 are idle), and then the second switch bridge arm 22 continues to operate (but the first switch bridge arm 21 and the third switch bridge arm 23 are idle). Although the sequence of operating of the first switch bridge arm 21, the second switch bridge arm 22, and the third switch bridge arm 23 is different, the same technical effect can still be achieved.

Therefore, it can be seen from the above description that when the multi-phase power converter has N switch bridge arms, the N switch bridge arms are alternately driven at intervals of 360/N degrees of the AC power source $V_{AC}$.

Figure 7A:
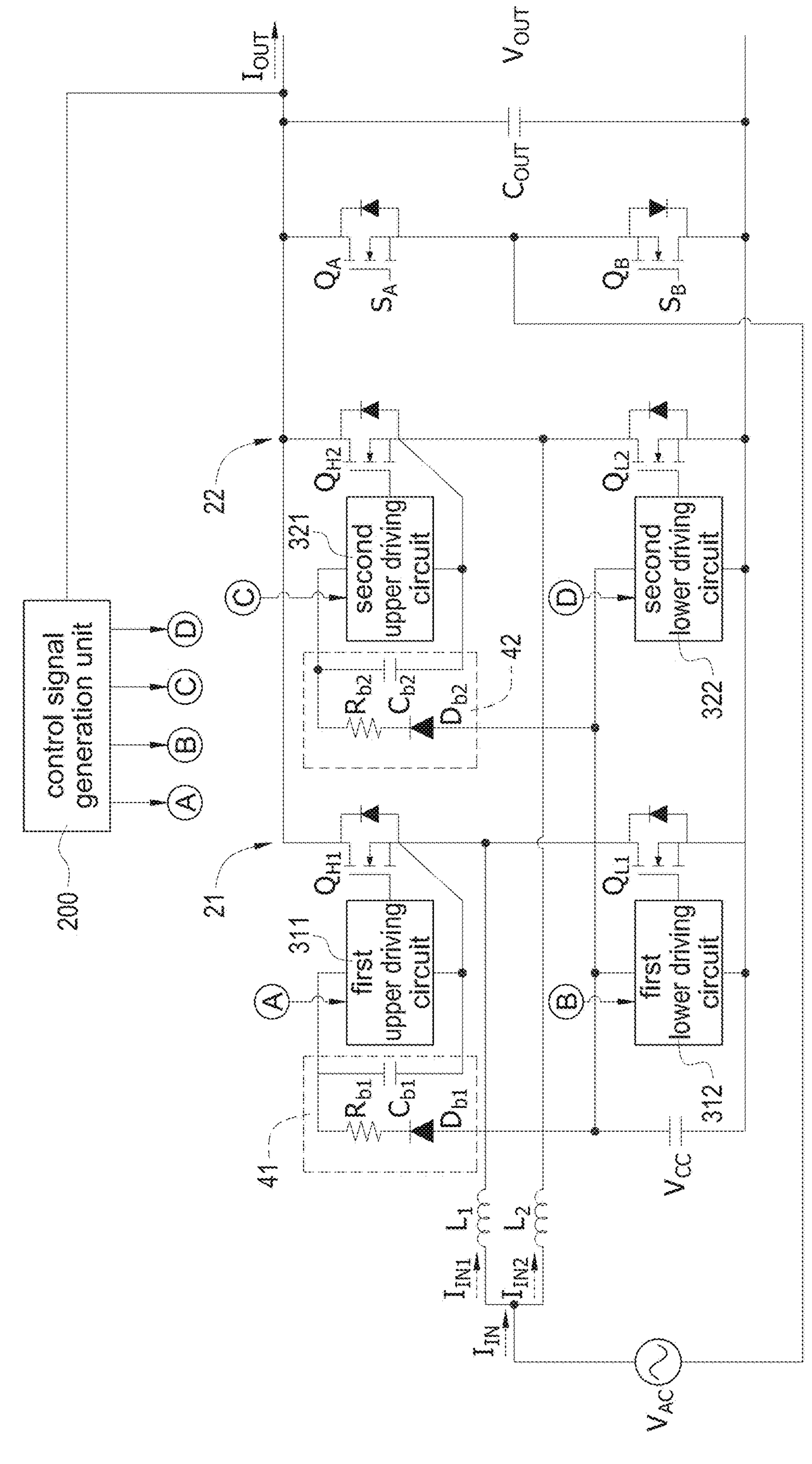
FIG. 7A and FIG. 7B are circuit diagrams of the multi-phase power converter having a Totem-Pole power factor correction circuit according to the present disclosure.
Figure 7B:
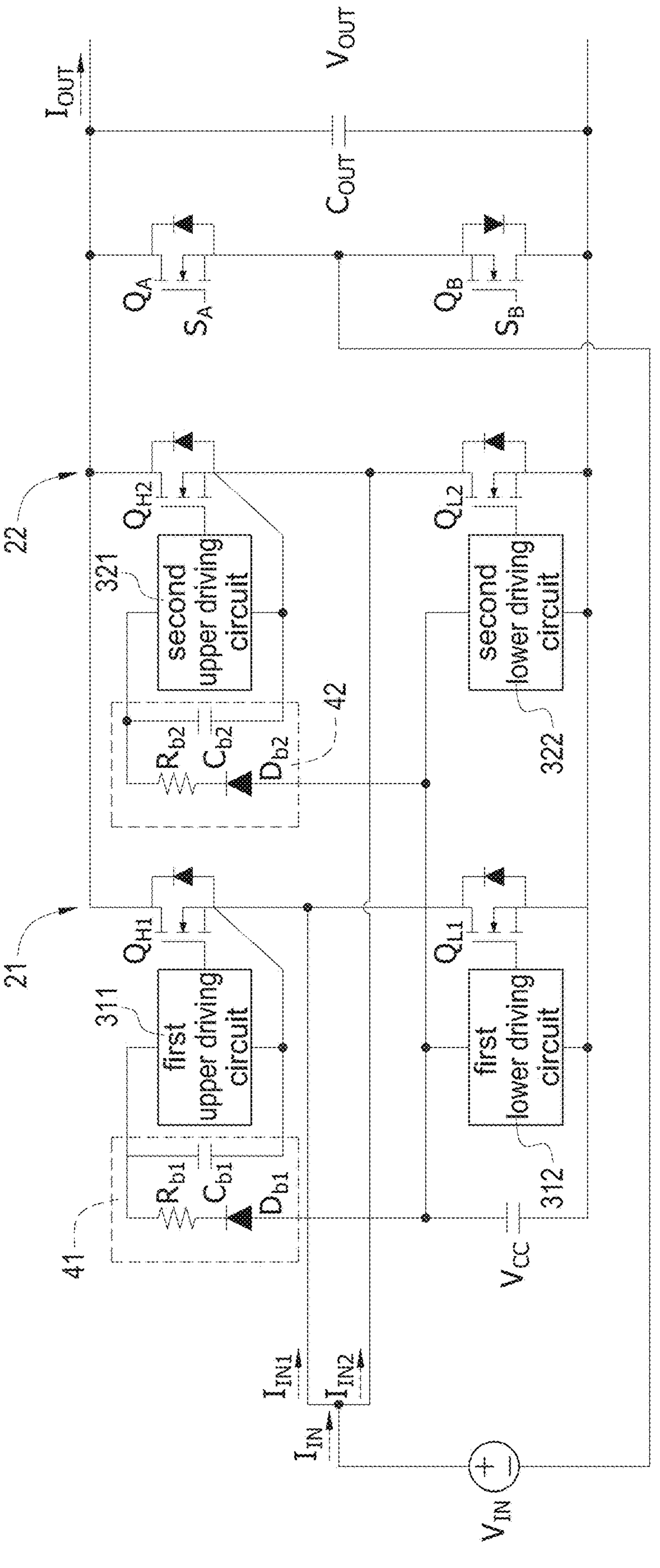

Please refer to FIG. 7A and FIG. 7B, which show circuit diagrams of the multi-phase power converter having a Totem-Pole power factor correction (PFC) circuit according to the present disclosure. The Totem-Pole PFC circuit includes a first switch bridge arm 21, a second switch bridge arm 22, a first upper driving circuit 311 and a first lower driving circuit 312, a second upper driving circuit 321 and a second lower driving circuit 322, a first bootstrap circuit 41, a second bootstrap circuit 42, and a DC driving voltage Vcc.

The first switch bridge arm 21 includes a first upper switch $Q_{H1}$ and a first lower switch $Q_{L1}$ connected in series. The second switch bridge arm 22 includes a second upper switch $Q_{H2}$ and a second lower switch $Q_{L2}$ connected in series. The first upper driving circuit 311 and the first lower driving circuit 312 respectively control the first upper switch Qui and the first lower switch $Q_{L1}$. The second upper driving circuit 321 and the second lower driving circuit 322 respectively control the second upper switch $Q_{H2}$ and the second lower switch $Q_{L2}$.

The first bootstrap circuit 41 is coupled to the first upper driving circuit 311 and the first upper switch $Q_{H1}$. In this embodiment, the first bootstrap circuit 41 includes a first diode $D_{b1}$, a first current-limiting resistor $R_{b1}$, and a first capacitor $C_{b1}$. The first current-limiting resistor $R_{b1}$ is connected to the first diode $D_{b1}$ in series. The first capacitor $C_{b1}$ is connected to the first current-limiting resistor $R_{b1}$ and the first upper driving circuit 311.

The second bootstrap circuit 42 is coupled to the second upper driving circuit 321 and the second upper switch $Q_{H2}$. In this embodiment, the second bootstrap circuit 42 includes a second diode $D_{b2}$, a second current-limiting resistor $R_{b2}$, and a second capacitor $C_{b2}$. The second current-limiting resistor $R_{b2}$ is connected to the second diode $D_{b2}$ in series. The second capacitor $C_{b2}$ is connected to the second current-limiting resistor $R_{b2}$ and the second upper driving circuit 321.

The DC driving voltage Vcc supplies power required by the first upper driving circuit 311, the first lower driving circuit 312, the second upper driving circuit 321, and the second lower driving circuit 322.

The alternately driving of the first switch bridge arm 21 and the second switch bridge arm 22 at the light-loading condition is described as follows. When the AC power source $V_{AC}$ is in the positive half cycle, the first switch bridge arm 21 is driven to operate, and the second switch bridge arm 22 is idle. In this condition, in addition to providing the power required by the first lower driving circuit 312 to maintain the first lower driving circuit 312 to normally control the first lower switch $Q_{L1}$, the DC driving voltage Vcc also supplies power to the first bootstrap circuit 41. Therefore, the DC driving voltage Vcc turns on the first diode $D_{b1}$, charges the first capacitor $C_{b1}$, and builds and maintains a first capacitor voltage on the first capacitor $C_{b1}$ to provide the power required by the first upper driving circuit 311 so that the first upper driving circuit 311 can normally control the first upper switch $Q_{H1}$. In this embodiment, the first current-limiting resistor $R_{b1}$ connected to the first diode $D_{b1}$ in series is used to limit the magnitude of the current flowing through the series-connected branch.

When the AC power source $V_{AC}$ is in the negative half cycle, the second switch bridge arm 22 is driven to operate, and the first switch bridge arm 21 is idle. In this condition, in addition to providing the power required by the second lower driving circuit 322 to maintain the second lower driving circuit 322 to normally control the second lower switch $Q_{L2}$, the DC driving voltage Vcc also supplies power to the second bootstrap circuit 42. Therefore, the DC driving voltage Vcc turns on the second diode $D_{b2}$, charges the second capacitor $C_{b2}$, and builds and maintains a second capacitor voltage on the second capacitor $C_{b2}$ to provide the power required by the second upper driving circuit 321 so that the second upper driving circuit 321 can normally control the second upper switch $Q_{H2}$. In this embodiment, the second current-limiting resistor $R_{b2}$ connected to the second diode $D_{b2}$ in series is used to limit the magnitude of the current flowing through the series-connected branch.

Figure 8:
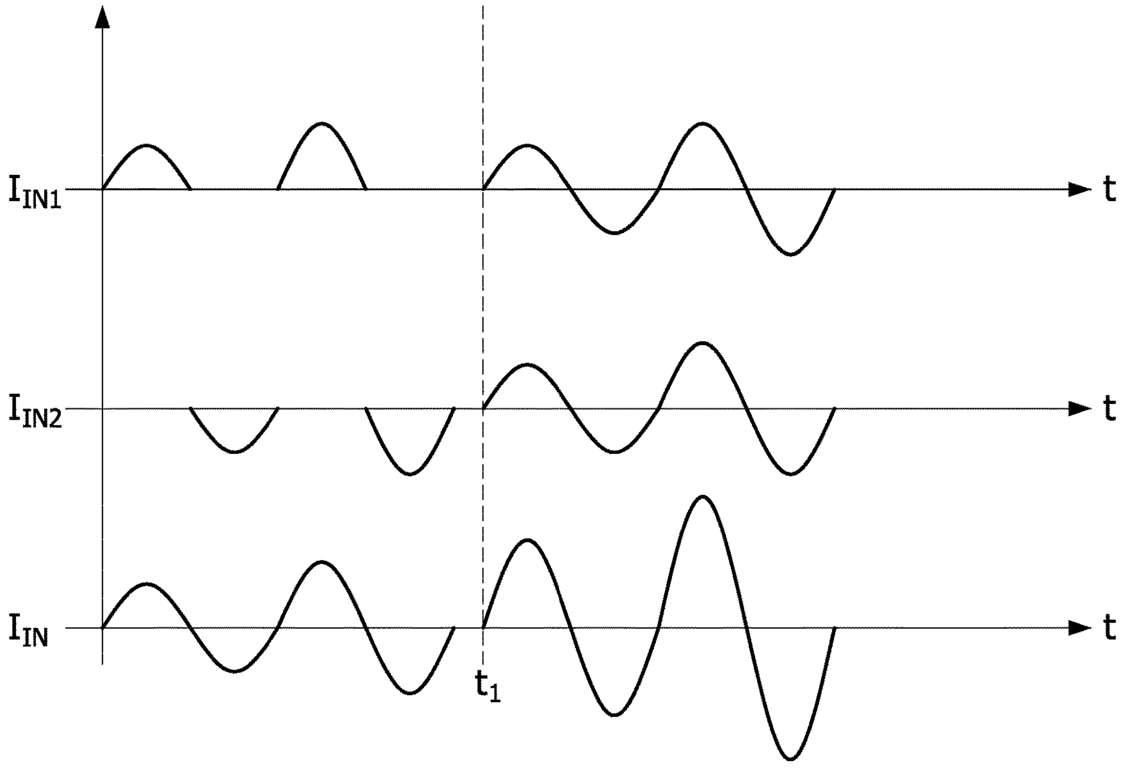
FIG. 8 is a schematic current waveform diagram of alternately driving switch bridge arms of the multiple-phase power converter according to the present disclosure.

Please refer to FIG. 8, which shows a schematic current waveform diagram of alternately driving switch bridge arms of the multiple-phase power converter according to the present disclosure. Since the two switch bridge arms are alternately driven at the light-loading condition, the total harmonic distortion (THD) of the total input current $I_{IN}$ summed by the first input current $I_{IN1}$ and the second input current $I_{IN2}$ is significantly reduced, and has excellent current quality.

As disclosed in FIG. 5 to FIG. 8 and the corresponding descriptions thereof, the multi-phase power converter 100 disclosed in the present disclosure is not limited to the AC-to-DC conversion, but can also be applied to a DC-to-DC conversion that the power conversion circuits 11-1N connected in parallel. The multi-phase power converter 100 is used for DC-to-DC conversion, and the input power source $V_{IN}$ thereof is a DC power source. In order to keep the voltage of the first capacitor $C_{b1}$ in the first bootstrap circuit 41 greater than the UVLO voltage of the first upper driving circuit 311 and keep the voltage of the voltage of the second capacitor $C_{b2}$ in the second bootstrap circuit 42 greater than the UVLO voltage of the second upper driving circuit 321, each switch bridge arm 21, 22 (shown in FIG. 7 and in FIG. 5) or each switch bridge arm 21, 22, 23 (shown in FIG. 6) in the multi-phase power converter 100 has a fixed switching cycle. In particular, the switching cycle is positively related to the capacitances of the first capacitor $C_{b1}$ and the second capacitor $C_{b2}$. That is, when the capacitances of the first capacitor $C_{b1}$ and the second capacitor $C_{b2}$ are larger, the fixed switching cycle is longer. In other words, when the input power source $V_{IN}$ is a DC power supply, the switch bridge arms 21, 22, 23 are alternately driven in the fixed switching cycle so as to ensure that the first upper driving circuit 311 corresponding to the first upper switch $Q_{H1}$ and the second upper driving circuit 321 corresponding to the second upper switch $Q_{H2}$ operate normally. Incidentally, when the multi-phase power converter 100 can receive both the AC and DC input power $V_{IN}$ and the multi-phase power converter 100 has N switch bridge arms, the N switch bridge arms are alternately driven at intervals of 360/N degrees of the AC power source $V_{AC}$.

Figure 9:
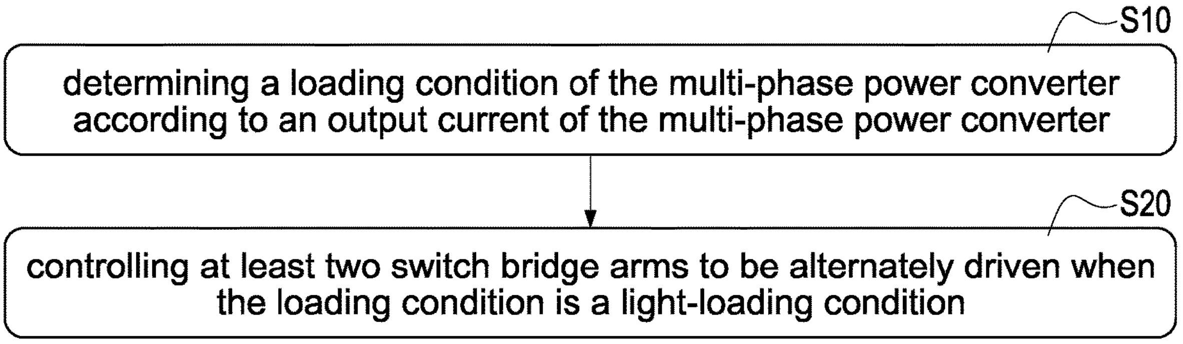
FIG. 9 is a flowchart of a method of controlling the multi-phase power converter according to the present disclosure.

Please refer to FIG. 9, which shows a flowchart of a method of controlling the multi-phase power converter according to the present disclosure. The multi-phase power converter 100 includes at least two power conversion circuits 11-1N, 21-23, and each power conversion circuit 11-1N includes a switch bridge arm formed by an upper switch $Q_{H1}$, $Q_{H2}$, $Q_{H3}$ and a lower switch $Q_{L1}$, $Q_{L2}$, $Q_{L3}$ connected in series. The method includes steps of: determining a loading condition of the multiple-phase power converter 100 according to an output current $I_{OUT}$ of the multiple-phase power converter 100 (step S10). Afterward, controlling the at least two power conversion circuits to be alternately driven when the loading condition is a light-loading condition (step S20). Since the specific circuit structure and operation description have been detailed in the previous disclosure, no more details will be given here.

In summary, the present disclosure has the following features and advantages:

1. The driving circuit of the multi-phase power converter of the present disclosure uses a single power supply so that it is beneficial to the miniaturized circuit design and cost reduction.

2. The total harmonic distortion of the total input current is significantly reduced, which increases the current quality.
3. The multi switch bridge arms are driven alternately, and each with an average conduction/turned-on time so that the power loss is also average. Moreover, the temperatures of the switch transistors are more even. In addition to the design that helps with heat dissipation and cooling, it is also less likely to cause a large difference in life due to imbalance in usage time.

Although the present disclosure has been described with reference to the preferred embodiment thereof, it will be understood that the present disclosure is not limited to the details thereof. Various substitutions and modifications have been suggested in the foregoing description, and others will occur to those of ordinary skill in the art. Therefore, all such substitutions and modifications are intended to be embraced within the scope of the present disclosure as defined in the appended claims.

What is claimed is:

1. A multi-phase power converter, configured to convert an input power source into an output power source, the multi-phase power converter comprising:

at least two power conversion circuits, each power conversion circuit comprising a switch bridge arm formed by an upper switch and a lower switch connected in series; and a control signal generation unit, configured to receive an output current of the multi-phase power converter and acquire a loading condition of the multi-phase power converter according to the output current, and provide control signals for each upper switch and each lower switch;

wherein the control signal generation unit is configured to correspondingly turn on or turn off the upper switches and the lower switches according to the loading condition being a light-loading condition so that the at least two switch bridge arms are alternately and non-simultaneously driven with any switching cycle in sequence such that each of the at least two switch bridge arms is driven for a substantially equal time period.

2. The multi-phase power converter as claimed in claim 1, wherein the input power source is an alternating current power source, and the at least two switch bridge arms are alternately driven according to a time period of the alternating current power source.

3. The multi-phase power converter as claimed in claim 2, wherein the number of the at least two switch bridge arms is two, and the two switch bridge arms are alternately driven when a positive half cycle and a negative half cycle of the alternating current power source are exchanged.

4. The multi-phase power converter as claimed in claim 2, wherein the number of the at least two switch bridge arms is an integer N, and the N switch bridge arms are alternately driven at intervals of 360/N degrees of the alternating current power source.

5. The multi-phase power converter as claimed in claim 1, wherein the at least two power conversion circuits form a Totem-Pole power factor correction circuit, and the Totem-Pole power factor correction circuit comprises:

a first switch bridge arm, comprising a first upper switch and a first lower switch connected in series;

a second switch bridge arm, comprising a second upper switch and a second lower switch connected in series;

a first upper driving circuit and a first lower driving circuit, configured to respectively control the first upper switch and the first lower switch;

a second upper driving circuit and a second lower driving circuit, configured to respectively control the second upper switch and the second lower switch;

a first bootstrap circuit, coupled to the first upper driving circuit and the first upper switch;

a second bootstrap circuit, coupled to the second upper driving circuit and the second upper switch; and a direct current driving voltage, configured to supply power required by the first upper driving circuit, the first lower driving circuit, the second upper driving circuit, and the second lower driving circuit.

6. The multi-phase power converter as claimed in claim 5, wherein the first bootstrap circuit comprises:

a first diode;

a first current-limiting resistor, connected to the first diode in series; and a first capacitor, connected to the first current-limiting resistor and the first upper driving circuit; and wherein the second bootstrap circuit comprises:

a second diode;

a second current-limiting resistor, connected to the second diode in series; and a second capacitor, connected to the second current-limiting resistor and the second upper driving circuit.

7. The multi-phase power converter as claimed in claim 1, wherein the input power source is a direct current power source, and the at least two switch bridge arms are alternately driven in a fixed switching cycle to ensure that an upper driving circuit corresponding to the upper switch operates normally.

8. The multi-phase power converter as claimed in claim 7, wherein the number of the at least two switch bridge arms is an integer N, and the N switch bridge arms are alternately driven at intervals of 360/N degrees of an alternating current power source.

9. The multi-phase power converter as claimed in claim 1, wherein the control signal generation unit is configured to correspondingly turn on or turn off the upper switches and the lower switches according to the loading condition being a heavy-loading condition so that the at least two switch bridge arms are simultaneously driven.

10. A method of controlling a multi-phase power converter, the multi-phase power converter comprising at least two power conversion circuits, and each power conversion circuit comprising a switch bridge arm formed by an upper switch and a lower switch connected in series, the method comprising steps of:

determining a loading condition of the multi-phase power converter according to an output current of the multi-phase power converter; and controlling the at least two switch bridge arms to be alternately and non-simultaneously driven with any switching cycle in sequence such that each of the at least two switch bridge arms is driven for a substantially equal time period when the loading condition is a light-loading condition.

11. The method of controlling the multi-phase power converter as claimed in claim 10, wherein an input power source is an alternating current power source, and the at least two switch bridge arms are alternately driven according to a time period of the alternating current power source.

12. The method of controlling the multi-phase power converter as claimed in claim 11, wherein the number of the at least two switch bridge arms is two, and the two switch bridge arms are alternately driven when a positive half cycle and a negative half cycle of the alternating current power source are exchanged.

13. The method of controlling the multi-phase power converter as claimed in claim 11, wherein the number of the at least two switch bridge arms is an integer N, and the N switch bridge arms are alternately driven at intervals of 360/N degrees of the alternating current power source.

14. The method of controlling the multi-phase power converter as claimed in claim 10, wherein an input power source is a direct current power source, and the at least two switch bridge arms are alternately driven in a fixed switching cycle to ensure that an upper driving circuit corresponding to the upper switch operates normally.

15. The method of controlling the multi-phase power converter as claimed in claim 14, wherein the number of the at least two switch bridge arms is an integer N, and the N switch bridge arms are alternately driven at intervals of 360/N degrees of an alternating current power source.

* * * * *